Figure 1:
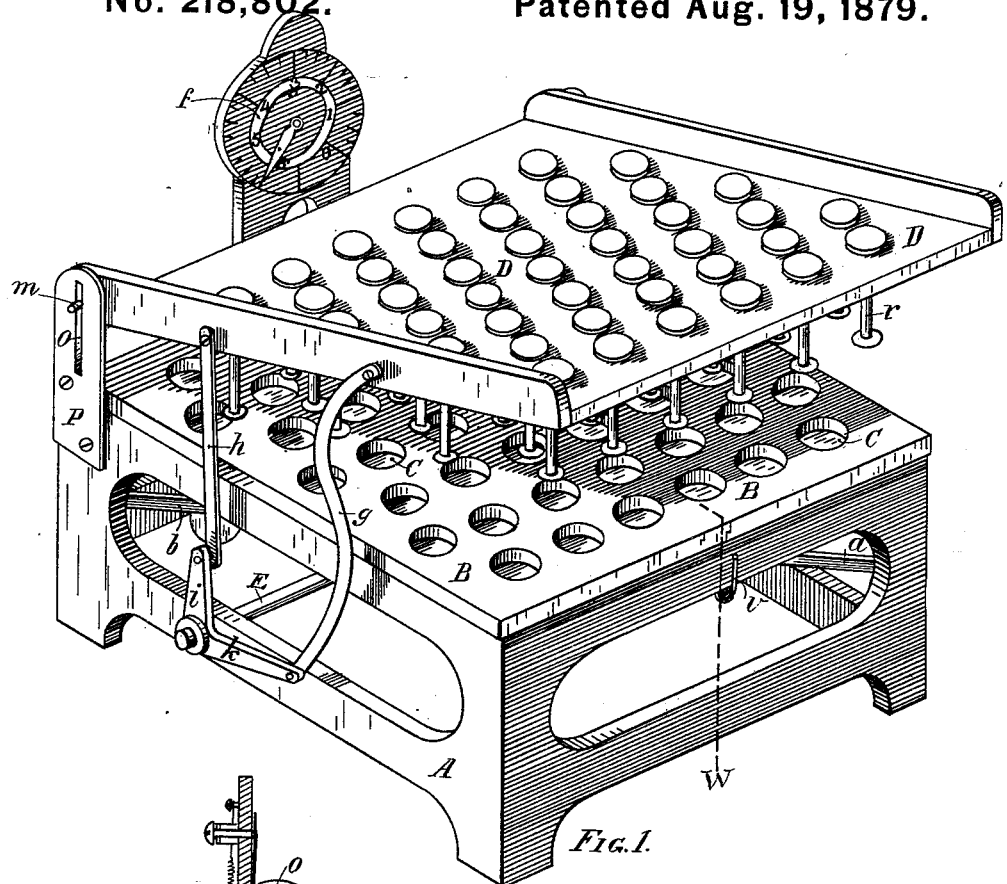

2 Sheets—Sheet 1.

J. H. WILLIAMS, S. MOORE & R. H. HURLBUT.
Surface-Measuring Machine.

No. 218,802. Patented Aug. 19, 1879.

Witnesses:
Homer Rogers,
Oscar L. Noble

Inventors:
James H. Williams
Stephen Moore
Rufus H. Hurlbut

2 Sheets—Sheet 2.

J. H. WILLIAMS, S. MOORE & R. H. HURLBUT.
Surface-Measuring Machine.

No. 218,802. Patented Aug. 19, 1879.

Witnesses:
Homer Roga
Oscar L. Roble

Inventors:
James H. Williams
Stephen Moore
Rufus H. Hurlbut

UNITED STATES PATENT OFFICE.

JAMES H. WILLIAMS AND STEPHEN MOORE, OF NEWTON, AND RUFUS H. HURLBUT, OF SUDBURY, ASSIGNORS TO THE STANDARD MEASURING MACHINE COMPANY, OF BOSTON, MASSACHUSETTS.

IMPROVEMENT IN SURFACE-MEASURING MACHINES.

Specification forming part of Letters Patent No. 218,802, dated August 19, 1879; application filed June 4, 1879.

*To all whom it may concern:*

Be it known that we, JAMES H. WILLIAMS and STEPHEN MOORE, both of Newton, county of Middlesex, and State of Massachusetts, and RUFUS H. HURLBUT, of Sudbury, in the county and State aforesaid, have invented certain new and useful Improvements in Machines for Measuring the Area of Surfaces having Irregular Outlines, such as skins, leather, &c.; and we do hereby declare the same to be described in the following specification, reference being had to the drawings accompanying and forming part of the same.

Our invention relates to that class of machines in which a series of weights or pins are suspended at equal distances from each other, each representing a certain part of a square foot of area, and so arranged and connected with weighing mechanism that by the operation of the machine such a number of such weights as collectively represent the area of the article being measured are displaced, and the area is indicated by the corresponding variation of a pointer on a dial attached to the weighing mechanism.

In machines as heretofore constructed the pins or weights which indicate the area required by their pressure on the weighing-platform have either been suspended in the weighing-platform above the table on which the article to be measured is placed, or have each consisted of a pin and a weight connected therewith by a spring, so that the pin by being depressed should deposit its weight upon the weighing-platform below. Both of these arrangements are objectionable in practice; and one feature of our invention consists in the combination of a perforated table, upon which the article to be measured is placed, with a weighing-platform close beneath it, and above it a movable table, from which are suspended a series of weights or pins, the bases of which are adapted to pass, by the downward movement of the said table, through the holes in the perforated table and be deposited upon the weighing-platform.

Another feature of our invention is a peculiar device for supporting and guiding the movable table in which the pins or weights are hung, whereby, when at its extreme elevation, it is inclined at an angle with the platform of the weighing mechanism, and as it is depressed or made to approach the said platform it automatically assumes a direction parallel to it, thus depositing the pins perpendicularly upon it. The object of this movement of the table is to permit the side next to the operator to be raised sufficiently high to readily allow the article to be measured to be spread upon the measuring-table without raising the whole table to so great a height, and at the same time to provide for bringing the pins down upon the platform in a perpendicular position.

To counterbalance the movable table mentioned, a weight is attached to a pivoted arm in such a manner that as the table is depressed the weight is raised in the arc of a circle, so that it stands nearly over its pivotal point, and thus exerts little pressure against the weight of the pin-carrying table when it is approached to the platform. This arrangement relieves, in a measure, the manual labor which would be necessary to force the table down its slight remaining distance after the pins are supported by the weighing-platform and the article being measured. This constitutes another feature of our invention.

Still another feature is a new form of pin for use in machines of this character, which, taken in connection with the table in which it is suspended, is adapted to be deposited upon the weighing-platform and be free from contact with its carrying-table, thus dispensing with the friction, which, in machines hitherto constructed, has been an obstacle to accurate measurement.

Still another feature of our invention is a device for preventing undue oscillation of the pointer on the dial connected with the weighing mechanism, which consists of a brake held lightly against the lever or some movable part of the weighing mechanism, and adapted to be removed from contact with the same, either automatically or otherwise, when the pointer has come to rest in an approximately correct position.

Figure 2:
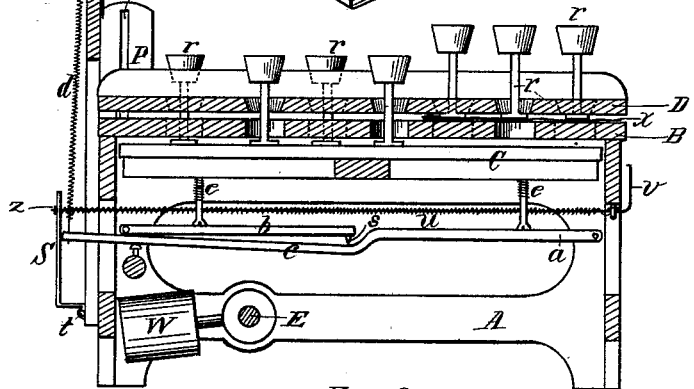
Figure 3:
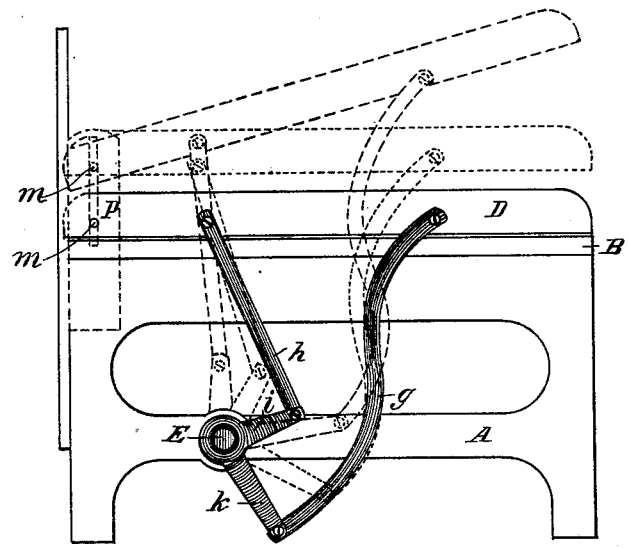
Figure 4:
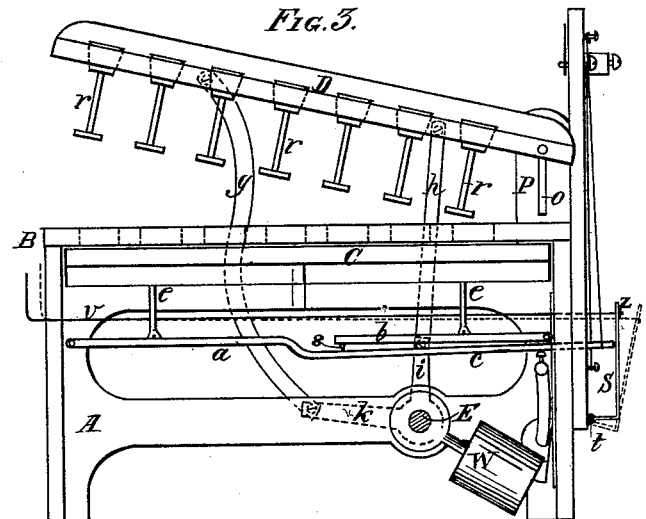

The accompanying drawings, in which like letters of reference refer to like parts, represent a machine embodying our invention, in which Figure 1 is a projection; Fig. 2, a vertical cross-section at line w, Fig. 1; Fig. 3, a diagram showing the position of the table carrying the pins and its supporting-levers at different elevations; Fig. 4, an interior end elevation, and Fig. 5 a modified form of pin.

A represents a suitable rectangular frame supporting a perforated table, B, more particularly described hereinafter. Beneath this table, and in close proximity thereto, is a platform, C, supported at four points, each equidistant from a corner of the same, by posts, (two of which, e e, are shown in Figs. 2 and 4,) which rest upon horizontal levers $a\ a\ b\ b$, which have their fulcra at the four interior angles of the frame A. Two of these levers, $b\ b$, which are pivoted at the rear (or left-hand side in Figs. 1 and 2) of the frame A, meet and are united at a point near the center of the said frame, and are there supported by a short post, s, resting upon the other two, $a\ a$, (pivoted at the front of the frame,) which are similarly united, and from the point of union the part c is a rigid continuance of the same to a point beyond the frame, at its rear, where it is suspended from a spring-balance, d, having a dial-face and pointer, as shown.

This last-described mechanism forms a platform-scale of substantially the usual construction, except that the variation of weight upon the platform C, instead of being indicated by a counterbalancing-poise, is shown by the pointer of the spring-balance on the dial-face f.

D is a table, in which holes are made at regular distances apart for carrying the pins $r\ r$, hereinafter described. This table is supported by four bars, $g\ g\ h\ h$, two of which are pivoted to it on each side, as shown, and is kept in position directly over the table B by projecting pins or lugs m, which enter slots o o in the ears P P, attached to the frame A, as shown.

E is a shaft extending across the lower portion of the frame A from side to side and journaled in the same. To each projecting end of this shaft is keyed a hub, from which radiate the unequal arms $k\ i$. To these arms are pivoted the lower ends of the bars $g\ h$, which at their opposite ends are pivoted to the table D, as shown. These bars are of such a length, and the position and length of the radial arms $k\ i$ are such, that as the table D is lifted at any point it rises in a horizontal position for a short distance, and then, by the partial revolution of the shaft E and the consequently changing position of the arms $k\ i$, the rear side ceases to rise and the front may be elevated to the position shown in Figs. 1 and 4. Fig. 3 shows the position of the arms and bars at different degrees of elevation of the table D.

The following dimensions of parts are given in order that any one skilled in the art may be able to readily construct a table having this peculiar movement.

The table D being four and one-half ($4\frac{1}{2}$) feet wide, the shaft E may be nineteen and one-half ($19\frac{1}{2}$) inches below the same, and fifteen (15) inches from the rear side of the frame A. The arms i and k and the bars h and g should be of the following lengths, measuring from the centers of their pivotal points in each case: arm i, nine (9) inches; arm k, twelve (12) inches; bar h, twenty-two and one-half ($22\frac{1}{2}$) inches: bar g, thirty-eight (38) inches. The upper end of bar h should be pivoted to the table D thirteen and one-half ($13\frac{1}{2}$) inches from its rear side, and bar g twenty-five (25) inches from bar h, and fifteen and one-half ($15\frac{1}{2}$) inches from the front side of table. The arms i and k are at such an angle to each other that the distance from the extreme pivotal point of one to the same point in the other is thirteen and one-half ($13\frac{1}{2}$) inches. These dimensions may be varied to suit the conditions required.

Upon the shaft E is a hub with a radial arm carrying a weight, W, so that as the said shaft is turned in either direction the said weight is moved in the arc of a circle of which the shaft E is the center. If the said arm carrying the weight W be adjusted (by a set-screw in its hub) in a perpendicular position over the shaft E when the table D is at its lowest point, it will be readily seen that in this position the weight W exerts no upward pressure on the table D. If, now, the said table be raised from its lowest to its highest point, the weight M will, by the turning of the shaft E, be moved from its position over it to one at its rear, and thus exert a gradually-increasing pressure against the table D. We prefer to set the arm carrying the weight at a slight angle backward from a perpendicular position over the shaft E when the table D is at its lowest point; but any adjustment may be made that will suit the convenience of the operator, it being understood that as the table D, carrying the pins or weights, approaches and the pins are supported by the weighing-platform, it is necessary, for ease of operation, that the table D should be at least partially relieved from the upward pressure from the weight W.

The pins, which are represented in Fig. 1 as suspended in the table D, and are shown in section in Fig. 2, are formed with a slender shank or body and a base of sufficient size and weight to enable them to stand upright without side support when deposited in a perpendicular position upon a level surface. The heads by which they are suspended are the frustums of cones having their larger diameter uppermost, and are of sufficient length to hold the pins firmly in a perpendicular position when placed in holes in which they fit closely.

The holes in the table B are so arranged that when the table D is brought down upon it they coincide with those in D, and are of such a size that the bases of the pins will readily pass through them. These pins are of such a length that when their bases rest upon the weighing-platform C, and the table D has been brought close down upon B, their heads will project for at least their entire length above the table D, and thus be free from contact therewith. This construction allows the pins to stand on the weighing-platform entirely free from support by the table D, and admits of an accurate weighing of the pins, which is impossible in machines as heretofore made.

Figure 5:
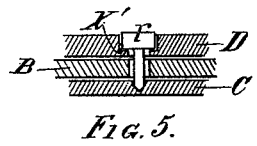

Fig. 5 represents another form of pin, which accomplishes the same purpose in a slightly different way. The head of this pin is cylindrical, and is prevented from slipping through the table in which it is supported by a slight contraction of the hole just at its lower surface, as shown at X, and it has no enlarged base, but is slightly rounded or pointed, so it may readily enter a hole or socket in the weighing-platform, by which it is supported in an upright position.

In practice we prefer the tapered heads, as shown in the main drawings; but the pointed pin may be used with advantage in certain cases.

It has been found in practice that the oscillation of the pointer of the dial $f$, connected with the weighing mechanism, is an obstacle to rapid work. This we overcome by means of a brake or lever, S, pivoted to the frame A at $t$, and held lightly against the end of lever $c$ by a spring, $u$, one end of which is attached to the front part of the frame A and the other to the brake $s$ or the rod $v$, which is attached to it at $z$, and which extends across to the front of the machine, as shown. The spring may, for convenience, encircle the rod, as shown.

By pressing the projecting end of the rod $v$ backward the brake may be removed from contact with the lever $c$. This may be arranged so as to operate automatically by the descent of the table D; but we prefer to operate it with the knee of the operator.

The operation of the machine is as follows: The table D being raised, as shown in Fig. 1, the skin or article to be measured is spread upon the table B, and the table D, carrying the pins $r\ r$, is brought down upon it, assuming a horizontal position before reaching it; and the pins are deposited in a perpendicular position upon the weighing-platform C, except such as are intercepted by the skin. (See $x$, Fig. 2.)

The dial $f$ being so marked that when all the pins rest upon the weighing-platform the pointer will indicate 0, and the pins upon each square foot of surface that are removed from the weighing-platform allowing the pointer to recede a space marked one foot, the area in square feet is indicated correctly, except so far as the brake S may prevent it. A slight pressure then applied to the end of the rod $v$, forcing it back, removes the pressure of the brake S and allows the pointer on the dial $f$ to indicate exactly the correct measurement.

What we claim as our invention is—

1. In a surface-measuring machine, the combination of a perforated table adapted to support an irregular surface to be measured, a weighing-platform close beneath it and above it, a movable table carrying a series of weights or pins, the bases of which are adapted to pass by its downward movement through the holes in the first-mentioned table and be deposited upon the weighing-platform, substantially as and for the purpose specified.

2. In a surface-measuring machine, in combination with a perforated table adapted to support an irregular surface to be measured and a weighing-platform just beneath it, a pin-carrying table adapted to be moved vertically to and from such first-mentioned table and to automatically assume a position parallel to it when approaching it, and inclined at an angle when most removed, substantially as herein set forth.

3. In combination, the table D, with its guiding-pins $m\ m$, the slots $o\ o$, the bars $h\ g$, arms $i\ k$, and shaft E, so arranged that the table D will, by the partial revolution of the shaft E and arms $i$ and $k$ in its upward movement, be carried first in a horizontal and afterward in an inclined position, as described.

4. In a machine for measuring irregular surfaces, the combination of a vertically-movable table carrying a series of weights or pins with a counterbalancing-weight for the same, so arranged that its pressure is, by the movement of the table, wholly or partially relieved from the said table at any desired point in its movement, as and for the purpose described.

5. In a machine for measuring irregular surfaces by a series of equidistant pins, in combination, a pin having an enlarged upper portion or head and a table for carrying the same, adapted to support it at right angles to said table, and by a downward movement to deposit the pin upon a suitable surface and leave it in an upright position free from all contact with the table in which it is carried.

6. In combination, the pin-carrying table D, the pins $r\ r$, and the weighing-platforms C, arranged and to operate as set forth.

7. In a machine for measuring irregular surfaces, in combination, a series of equidistant pins, with mechanism for elevating and depressing the same, and the platform of a weighing-machine, so adapted to each other that when the said pins are deposited upon the platform in an upright position they will retain such position without other support.

8. In combination with the platform C, its supporting-levers $a\ a\ b\ b\ c$, and the spring-balance $d$, the brake S, spring $u$, and rod $v$, as and for the purposes set forth.

JAMES H. WILLIAMS.
STEPHEN MOORE.
RUFUS H. HURLBUT.

Witnesses:
HOMER ROGERS,
OSCAR L. NOBLE.